(12) United States Patent
Bulpin (10) Patent No.: US 10,867,601 B2
(45) Date of Patent: Dec. 15, 2020

(54) IN-BAND VOICE-ASSISTANT/CONCIERGE FOR CONTROLLING ONLINE MEETINGS

(71) Applicant: CITRIX SYSTEMS, INC., Fort Lauderdale, FL (US)

(72) Inventor: James Roy Bulpin, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 59 days.

(21) Appl. No.: 15/873,252

(22) Filed: Jan. 17, 2018

(65) Prior Publication Data

US 2019/0221209 A1    Jul. 18, 2019

(51) Int. Cl.
| | |
|---|---|
| *G10L 15/22* | (2006.01) |
| *G10L 15/30* | (2013.01) |
| *H04L 29/06* | (2006.01) |
| *G10L 15/08* | (2006.01) |
| *H04M 3/56* | (2006.01) |
| *G06F 3/16* | (2006.01) |

(52) U.S. Cl.
CPC .............. *G10L 15/22* (2013.01); *G06F 3/167* (2013.01); *G10L 15/08* (2013.01); *G10L 15/30* (2013.01); *H04L 65/403* (2013.01); *H04M 3/563* (2013.01); *G10L 2015/088* (2013.01); *G10L 2015/223* (2013.01); *H04M 2201/40* (2013.01); *H04M 2250/62* (2013.01); *H04M 2250/74* (2013.01)

(58) Field of Classification Search
CPC ......... G10L 15/22; G10L 15/08; G10L 15/30; H04L 65/403; H04L 2015/088; H04L 2015/223
See application file for complete search history.

(56) References Cited

U.S. PATENT DOCUMENTS

| | | | | |
|---|---|---|---|---|
| 5,870,675 | A * | 2/1999 | Tuutijarvi | H04J 3/17 370/331 |
| 6,549,790 | B1 * | 4/2003 | Rubbmark | H04M 1/6066 455/557 |
| 7,418,392 | B1 * | 8/2008 | Mozer | G10L 15/26 315/307 |
| 9,924,270 | B2 * | 3/2018 | Shanmugam | H04R 5/033 |

(Continued)

FOREIGN PATENT DOCUMENTS

CN          103337242          10/2016

*Primary Examiner* — Fariba Sirjani
(74) *Attorney, Agent, or Firm* — Allen, Dyer, Doppelt + Gilchrist, PA (57) ABSTRACT

A computing device includes a hardware interface to be coupled to a microphone and speaker assembly, and a network interface to be coupled to a network for audio conferencing with remote audio conferencing devices and for accessing a voice assistant service that operates to assist with the audio conferencing. An audio interceptor is coupled between the hardware interface and the network interface to direct audio over a first voice channel while audio conferencing with the remote audio conferencing devices. The audio interceptor monitors for a user initiated trigger command signal during the audio conferencing, and directs audio from the first voice channel to a second voice channel upon detection of the user initiated trigger command signal. The second voice channel is used to access the voice assistant service.

18 Claims, 6 Drawing Sheets

(56) References Cited

U.S. PATENT DOCUMENTS

| | | | |
|---|---|---|---|
| 2002/0178277 A1* | 11/2002 | Laksono | H04N 21/6581 |
| | | | 709/231 |
| 2007/0027917 A1* | 2/2007 | Ariel | G06F 16/285 |
| 2009/0094533 A1* | 4/2009 | Bozionek | H04L 67/18 |
| | | | 715/753 |
| 2010/0291880 A1* | 11/2010 | Feldstein | H04B 1/40 |
| | | | 455/73 |
| 2013/0141516 A1* | 6/2013 | Baldwin | H04N 7/152 |
| | | | 348/E7.077 |
| 2013/0316686 A1* | 11/2013 | Subbaramoo | H04W 12/02 |
| | | | 455/418 |
| 2014/0297288 A1* | 10/2014 | Yu | G10L 15/30 |
| | | | 704/275 |
| 2014/0344420 A1* | 11/2014 | Rjeili | H04M 1/72569 |
| | | | 709/220 |
| 2015/0254053 A1* | 9/2015 | Gardner | G05B 15/02 |
| | | | 700/83 |
| 2017/0358301 A1* | 12/2017 | Raitio | G10L 13/033 |
| 2017/0372268 A1 | 12/2017 | Ilan et al. | |
| 2018/0157333 A1* | 6/2018 | Ross | G06F 21/6245 |
| 2018/0176270 A1* | 6/2018 | Griffin | G06Q 10/06314 |
| 2018/0267774 A1* | 9/2018 | Williams | G06F 3/02 |
| 2018/0316893 A1* | 11/2018 | Rosenberg | H04L 65/403 |
| 2019/0042187 A1* | 2/2019 | Truong | G06F 21/32 |
| 2019/0173446 A1* | 6/2019 | Knode | H03G 3/32 |
| 2019/0179611 A1* | 6/2019 | Wojogbe | G06F 3/167 |
| 2019/0182536 A1* | 6/2019 | Shintani | H04N 21/439 |
| 2019/0188624 A1* | 6/2019 | Pong | G06Q 10/063112 |

* cited by examiner

IN-BAND VOICE-ASSISTANT/CONCIERGE FOR CONTROLLING ONLINE MEETINGS

TECHNICAL FIELD

The present disclosure relates to online meetings, and more particularly, to the use of a voice recognition/personal assistant device during an online meeting.

BACKGROUND

Services are being developed to automate many aspects of managing and using collaboration spaces, such as meeting rooms. As an example, the Citrix Smart Spaces service can manage Skype-for-Business meetings by providing and automating hardware permanently installed in a meeting room to launch a Skype online meeting based on entries in the meeting room's calendar.

Voice recognition/personal assistant devices may also be used alongside the Skype-for-Business meetings. Voice recognition/personal assistant devices include, for example, Amazon Echo, Google Home, Apple Siri, and Microsoft Cortana. Voice recognition/personal assistant devices may be used within the meeting rooms to enable meeting participants to control the meeting, including actions such as booking an ad-hoc meeting, launching Skype-for-Business video conferencing, and controlling the room's webcam.

However, having both a conference audio device and a voice recognition/personal assistant device within the meeting room leads to higher cost and more clutter in the room. Consequently, there is a need to address these concerns.

SUMMARY

A computing device includes a housing, a hardware interface carried by the housing, a network interface carried by the housing, and an audio interceptor carried by the housing. The hardware interface is to be coupled to a microphone and speaker assembly. The network interface is to be coupled to a network for audio conferencing with at least one remote audio conferencing device, and for accessing a voice assistant service that operates to assist with the audio conferencing. The audio interceptor is coupled between the hardware interface and the network interface. The audio interceptor is configured to direct audio from the hardware interface to the network interface over a first voice channel while audio conferencing with the at least one remote audio conferencing device, monitor for a user initiated trigger command signal during the audio conferencing, and direct audio from the first voice channel to a second voice channel upon detection of the user initiated trigger command signal. The second voice channel is used to access the voice assistant service.

The audio interceptor permits the voice assistant service to be accessible through the voice channel of the audio conferencing. This advantageously allows a single microphone and speaker assembly to be coupled to the computing device to provide audio for the remote audio conferencing devices and to provide audio for the voice assistant service.

The audio interceptor may comprise a wake-word detector module to monitor the first voice channel during the audio conferencing for a wake-word, and upon detection of a wake-word, generates the user initiated trigger command signal. Alternatively, or in addition to, the audio interceptor may comprise a push-to-talk device for providing the user initiated trigger command signal in response to a user activating the push-to-talk device.

The second voice channel may be separate from the first voice channel, and the audio interceptor may be further configured to mute the first voice channel so that the audio following the user initiated trigger command signal is not received by the at least one remote audio conferencing device.

The audio interceptor may comprise an audio director module in a path of the first voice channel, and may be configured to direct the audio following the user initiated trigger command signal to the second voice channel.

The audio interceptor may further comprise a voice-assistance client module in a path of the second voice channel, and may be configured to access the voice assistant service via the network interface.

The audio interceptor may further comprise a trigger command module activated by the user so as to generate the user initiated trigger command signal, with the user initiated trigger command signal being provided to the audio director module to direct the audio following the trigger command signal to the voice-assistance client module.

The voice-assistance client module may be configured to receive a voice assistance audio response from the voice assistant service in response to the voice assistant service receiving audio following the user initiated trigger command signal. The audio director module may be further configured to mix the voice assistance audio response with audio from the at least one remote audio conferencing device while audio conferencing, but with the mixed voice assistance audio response not being received by the at least one remote audio conferencing device while audio conferencing.

The computing device may further comprising an audio-conferencing module carried by the housing, with the audio-conferencing module in a path of the first voice channel and configured to support audio conferencing with the at least one remote audio conferencing device. Alternatively, the computing device may be configured as a virtual computing device that remotely interfaces with an audio-conferencing module via the network interface so as to audio conference with the at least one remote audio conferencing device.

Another aspect is directed to a method for operating a computing device as described above. The method comprises directing audio from the hardware interface to the network interface over a first voice channel while audio conferencing with the at least one remote audio conferencing device; monitoring for a user initiated trigger command signal during the audio conferencing; and directing audio from the first voice channel to a second voice channel upon detection of the user initiated trigger command signal, with the second voice channel being used to access the voice assistant service.

Yet another aspect is directed to a non-transitory computer readable medium for a computing device, with the non-transitory computer readable medium having a plurality of computer executable instructions for causing the computing device to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime numbers refer to alternate embodiments.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
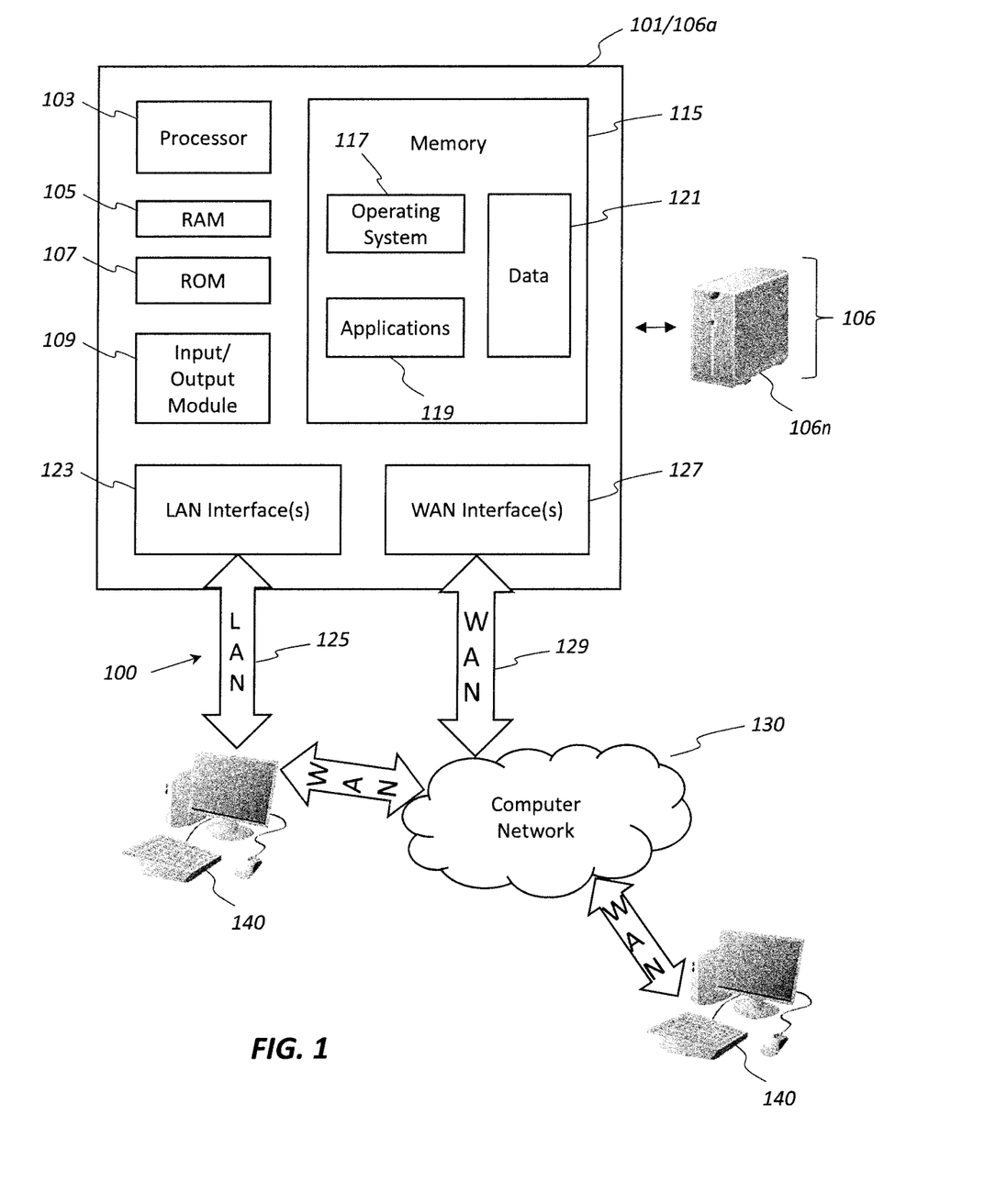
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as server(s) 106). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106.

Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality application functionality, or load balancing functionality.

Some embodiments include a first server 106 that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network.

Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band.

The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed.

A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
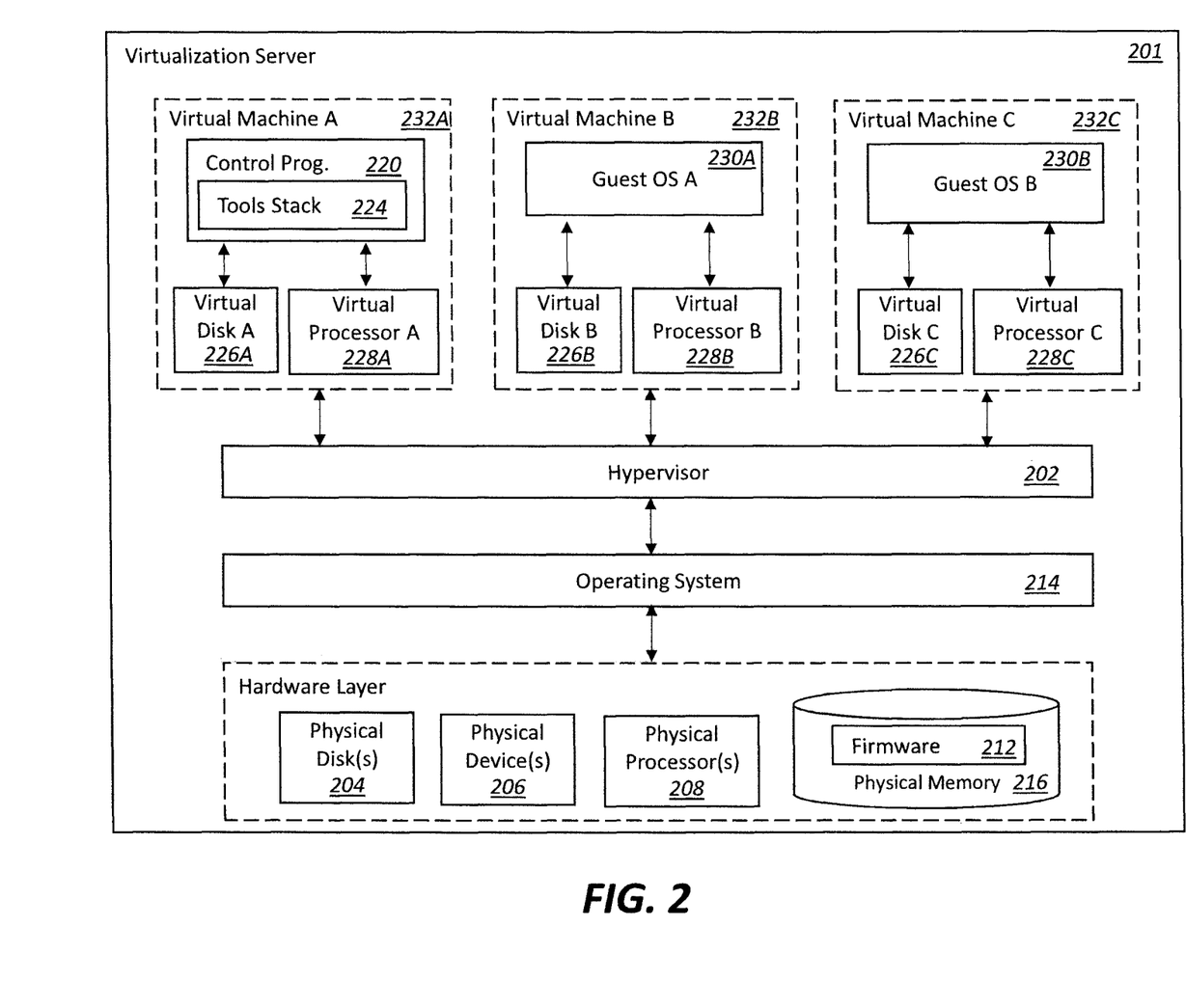
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208.

The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-232C (generally 232). Each virtual machine 232 may have a virtual disk 226A-226C and a virtual processor 228A-228C. In some embodiments, a first virtual machine 232A may execute, on a virtual processor 228A, a control program 220 that includes a tools stack 224. In other embodiments, one or more virtual machines 232B-232C may be executed, on a virtual processor 228B-228C, a guest operating system 230A-230B.

Further referring to FIG. 2, and in more detail, the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1.

For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201.

A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201.

The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine.

Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources.

System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201.

Hypervisor 202 may include those manufactured by VMWare, Inc., of Palo Alto, Calif.; the XEN hypervisor, an open source product whose development is overseen by the open source Xen Project community; HyperV, VirtualServer or virtual PC hypervisors provided by Microsoft, or others. In some embodiments, a virtualization server 201 executes a hypervisor 202 that creates a virtual machine platform on which guest operating systems may execute.

In these embodiments, the virtualization server 201 can be referred to as a host server. An example of such a virtualization server is XENSERVER provided by Citrix Systems, Inc., of Fort Lauderdale, Fla. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-232C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232.

In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-226C (generally 226) and a virtual processor 228A-228C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
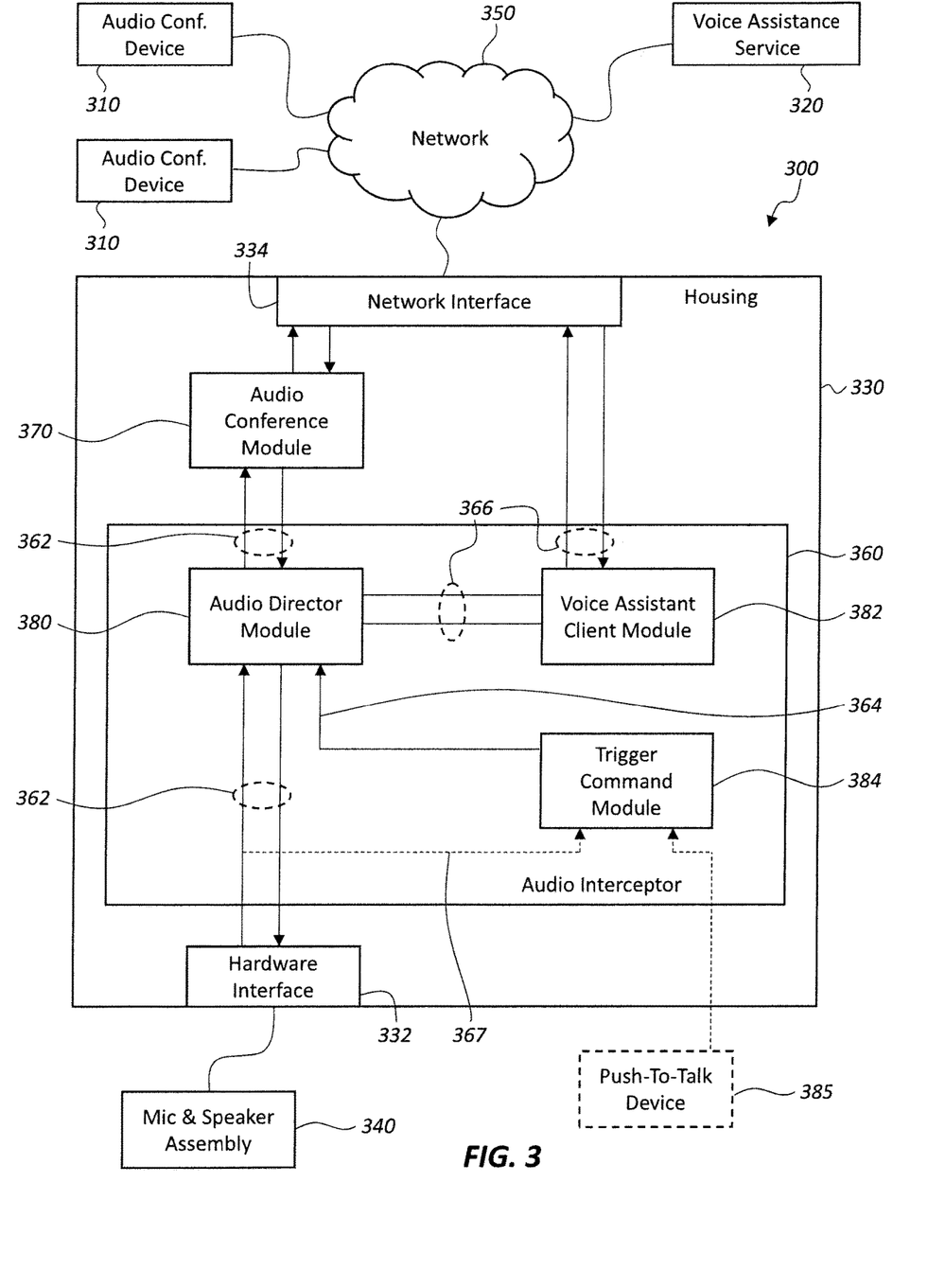
FIG. 3 is a schematic block diagram of a computing device with an audio interceptor in which various aspects of the disclosure may be implemented.

Turning now to FIG. 3, a computing device 300 configured to support audio conferencing with remote audio conferencing devices 310 and interaction with a cloud-based voice assistant service 320 will be discussed. The voice assistant service 320 may be used to enable voice management of the audio conferencing.

The voice assistant service 320 may be, for example, based on Amazon Echo, Google Home, Apple Siri, and Microsoft Cortana. The voice assistant service 320 may be used within meeting rooms to enable meeting participants to control the meeting.

As will be explained in detail below, the computing device 300 includes an audio interceptor 360 that permits the cloud-based voice assistant service 320 to be accessible through the voice channel of the audio conferencing. This advantageously allows a single microphone and speaker assembly 340 to be coupled to the computing device 300 to provide audio for the remote audio conferencing devices 310 and to provide audio for the voice assistant service 320. The audio interceptor 360 is configured such that audio provided to the voice assistant service 320 is not provided to the remote audio conferencing devices 310.

The illustrated computing device 300 includes a housing 330, a hardware interface 332 carried by the housing 330, a network interface 334 carried by the housing 330 and an audio interceptor 360 carried by the housing 330. The hardware interface 332 is to be coupled to the microphone and speaker assembly 340. The hardware interface may support a USB connector, for example. In other embodiments, the hardware interface 332 may be configured to support other types of connectors, such as RCA connectors. The network interface 334 is to be coupled to a network 350 for audio conferencing with the remote audio conferencing devices 310, and for accessing the voice assistant service 320 that operates to assist with the audio conferencing.

The audio interceptor 360 is coupled between the hardware interface 332 and the network interface 334. Between the network interface 334 and the audio interceptor 360 is an audio-conferencing module 370. The audio-conferencing module 370 may be a Microsoft application software product known as Skype-For-Business, for example.

The audio-conferencing module 370 may also support video conferencing, as readily appreciated by those skilled in the art. Consequently, the audio-conferencing module 370 may be referred to as an online meeting module, and the audio conferencing may be referred to as online meetings.

The audio interceptor 360 directs audio from the hardware interface 332 to the audio-conferencing module 370 over a first voice channel 362 while audio conferencing with the remote audio conferencing devices 310. The audio interceptor 360 monitors for a user initiated trigger command signal 364 during the audio conferencing. Upon detection of the user initiated trigger command signal 364, the audio interceptor 360 directs audio from the first voice channel 362 to a second voice channel 366, with the second voice channel 366 being used to access the voice assistant service 320.

The audio interceptor 360 includes an audio director module 380 in a path of the first voice channel 362, a voice-assistant client module 382 in a path of the second voice channel 366, and a trigger command module 384 for generating the trigger command signal 364. The trigger command signal 364 is user initiated. Under normal operation, the audio director module 380 passes both microphone and speaker audio between the microphone and speaker assembly 340 and the remote audio conferencing devices 310 via the audio conference module 370.

The audio director module 380 acts as a switch in response to the trigger command signal 364, which is provided by the trigger command module 384. The trigger command signal 364 may also be provided to the voice-assistant client module 382 indicating that audio is to be received from the audio director module 380. The trigger command module 384 may be configured as a wake-word detector module or as a push-to-talk device. Both options may be available to the computing device 300 with an administrator choosing which one, or both, are enabled.

When the trigger command module 384 is configured as the wake-word detector module, the first voice channel 362 is monitored during the audio conferencing for a wake-word, and upon detection of a wake-word, generates the trigger command signal 364. Since the wake-word is to be user initiated, the trigger command module 384 is coupled to the microphone audio path of the first voice channel 362 via signal path 367.

When the trigger command module 384 is configured as a push-to-talk device, a user accessible push-to-talk device 385 is provided. The trigger command signal 364 is generated in response to a user activating the push-to-talk device 385. The push-to-talk device 385 may interface with the trigger command module 384, as illustrated, or in other embodiments, is in lieu of the trigger command module 384. The push-to-talk device 385 may be a stand-alone device, as illustrated, or it may be integrated with the microphone and speaker assembly 340.

The second voice channel 366 is separate from the first voice channel 362. In addition to the audio director module 380 acting as a switch in response to the trigger command signal 364, the audio director module 380 also mutes the first voice channel 362 so that the audio following the user initiated trigger command signal 364 is not received by the remote audio conferencing devices 310.

In response to the trigger command signal 364, the audio director module 380 identifies that the user is issuing a command or question to the voice assistant service 320, rather than general audio as part of the audio conferencing. The audio director module 380 re-routes microphone and speaker streams to the voice-assistant client module 382. This has the effect of muting both the input and output to the audio conference module 370 enabling the user to interact with the voice assistant service 320 privately without the audio also being sent to the audio conferencing participants.

With the voice-assistant client module 382 in the path of the second voice channel 366, the voice-assistant client module 382 captures the voice command from the user as an audio file and sends it to an existing cloud-based voice assistant service 320, such as the Amazon Alexa Voice Service (AVS) via APIs.

The voice-assistance client module 382 is configured to receive a voice assistance audio response from the voice assistant service 320 in response to the voice assistant service receiving audio following the user initiated trigger command signal 364. The audio director module 380 is further configured to mix the voice assistance audio response with audio from the remote audio conferencing devices 310 while audio conferencing, but with the mixed voice assistance audio response not being received by the remote audio conferencing devices 310. In addition, the mixed audio may be such that a volume level from the remote audio conferencing devices 310 is reduced as compared to a volume level of the voice assistance audio response so that the user can still hear the audio conferencing in the background while the reply is being played.

Figure 4:
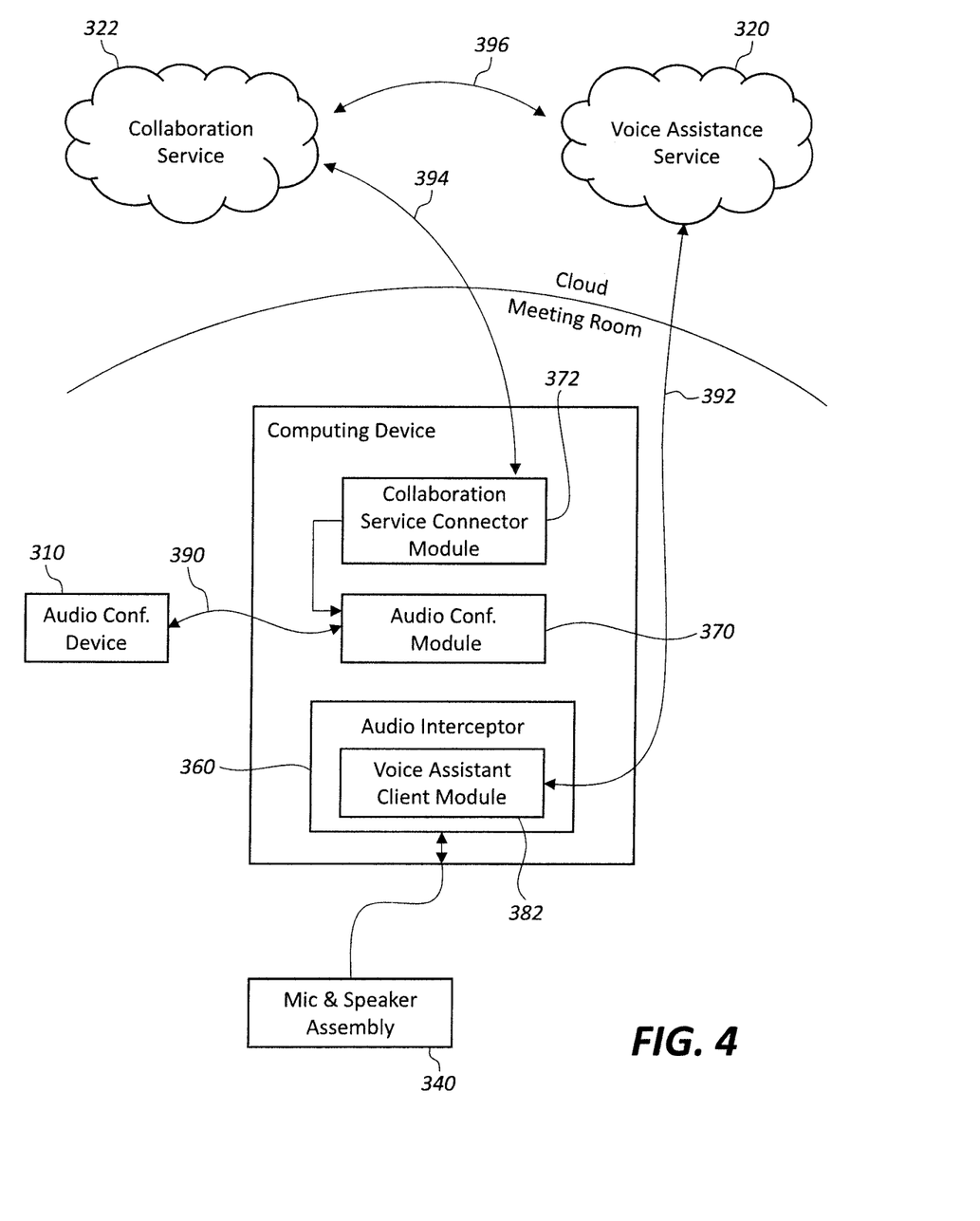
FIG. 4 is a schematic block diagram of the computing device illustrated in FIG. 3 illustrating external signal paths with the cloud-based voice assistant service and the cloud-based collaboration service.

Operation of the computing device 300 in terms of the voice assistant service 320 being used to enable voice management of the audio conferencing will now be discussed in reference to FIG. 4. To better illustrate the flow of information external the computing device 300, the network interface 334 and the network 350 are not shown. Instead, signal path 390 is directly shown between the audio conference module 370 and the remote audio conferencing devices 310, and signal path 392 is directly shown between the voice-assistant client module 382 and the cloud-based voice assistant service 320.

In support of the audio-conferencing module 370, a collaboration service connector module 372 is provided. The collaboration service connector module 372 may be used to manage the audio conferencing by automating hardware permanently installed in a meeting room, such as turning on or off screens, lights, and audio, for example. The collaboration service connector module 372 interfaces with a collaboration service 322 via path 394. The collaboration service 322 may be based on Smart Spaces for Collaboration by Citrix, for example.

After detection of the trigger command signal 364, the voice-assistant client module 382 captures the voice command from the user as an audio file. This audio file is then provided by the voice-assistant client module 382 to the voice assistant service 320 via signal path 392. The voice assistant service 320 performs voice recognition and processing to understand the user's command/question, and where relevant, passes it on to the collaboration service 322 via signal path 396 to handle. The collaboration service 322 interfaces with the collaboration service connector module 370 via signal path 394.

Based on the user's command/question as received by the voice assistant service 320, an audio file may be returned to the voice-assistant client module 382. The voice-assistant client module 382 will then play the audio file to the user via the audio director module 380. The audio director module 380 provides the audio file to the speaker audio path within the first voice channel 362 so that the audio file is not received by the remote audio conferencing devices 310.

As an example, questions about the meeting may be provided to the voice assistant service 320 via signal path 392, such as "when does this meeting end?" The voice assistant service 320 relays this question to the collaboration service 322 via signal path 396. The collaboration service 322 will interface with the collaboration service connector module 372 to query the meeting room's calendar to get the end time for the current meeting. An audio response, such as "in 35 minutes" is relayed back to the voice-assistant client module 382 by the collaboration service 322 and the voice assistant service 320.

As another example, an action may be performed on the meeting itself via the collaboration service 322. The user may say "end the meeting" and the voice assistant service 320 relays this request via signal path 396 to the collaboration service 322, which then passes the request to the collaboration service connector module 372. The collaboration service connector module 372 then interfaces with the audio conference module 370 so that the audio conferencing is terminated by using APIs on the audio conference module 370.

As yet another example, an action may be performed on the meeting booking in the room's calendar. For example, the user may say "extend the meeting by 30 minutes" and the voice assistant service 320 relays this request via signal path 396 to the collaboration service 322, which then passes the request to the collaboration service connector module 372. The collaboration service 322 updates the room's calendar entry to end 30 minutes later than previously set. Additionally, a textual response option provided to the voice-assistant client module 382 to report success or failure (e.g., if the room is booked by someone else).

Permitted voice commands thus include, but are not limited to, the following. The status of the current meeting may be queried, such as end time, people invited, people joined, and people who have left. The audio conference meeting may be managed, such as starting or ending the meeting, enabling or disabling meeting features such as webcams, screen sharing, recording, etc. The room booking may be managed in the calendar, such as extending or shortening the meeting, and inviting others to the active meeting. An application may be launched and shared via a screen sharing mechanism. A document may be opened and displayed via screen sharing. Lighting, blinds or other connected devices in the meeting room may be controlled.

The illustrated computing device 300 with the audio interceptor 360 could also be used in other collaboration scenarios, such as smart classrooms, where voice control could complement interactive audio/visual capabilities of the classroom. The computing device 300 with the audio interceptor 360 could be expanded to provide the capability for remote meeting participants to also vocally interact with the meeting, e.g., by using a similar proxy/switch on the client (mobile, perhaps) device, or by routing audio via a similar proxy/switch somewhere within the infrastructure.

Figure 5:
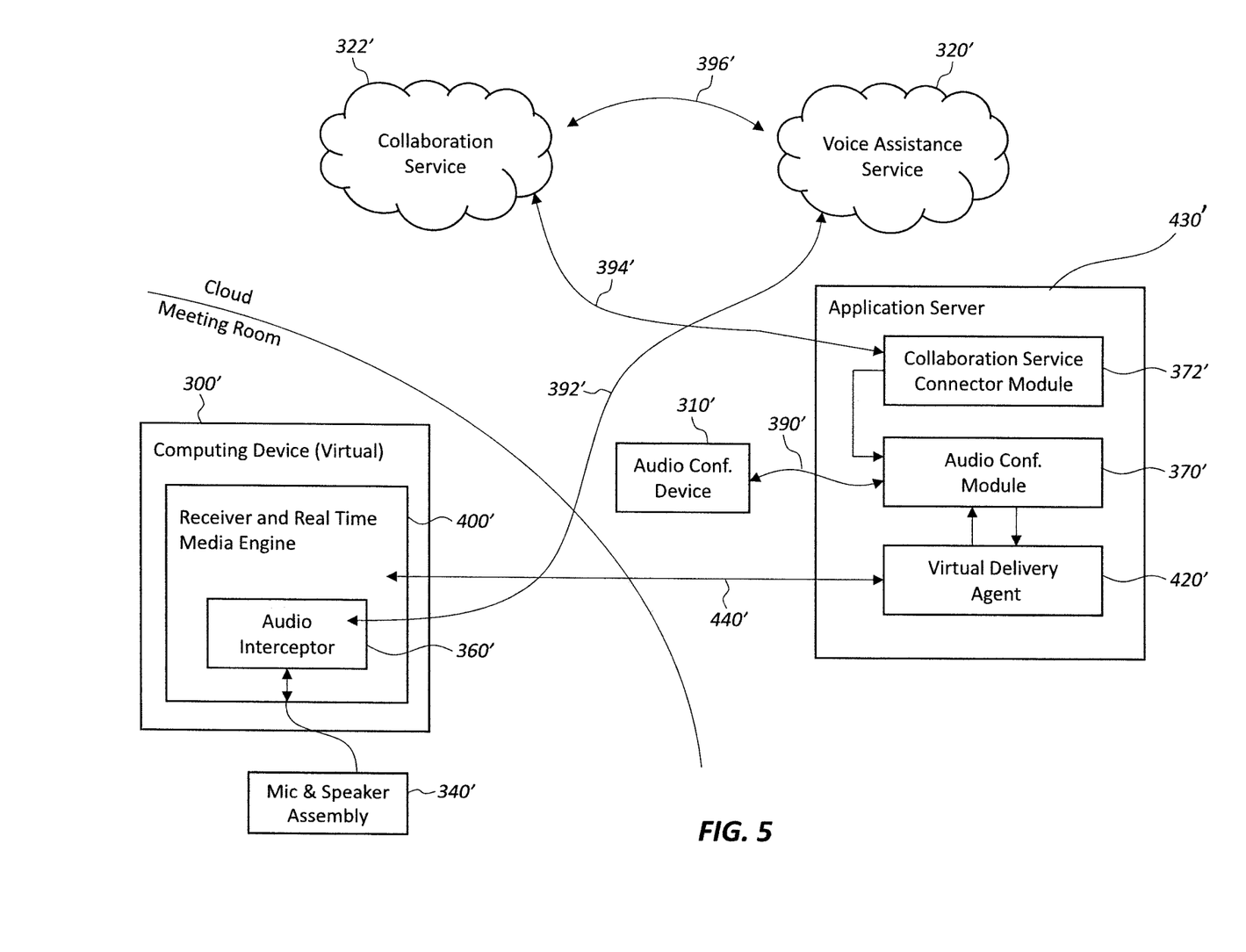
FIG. 5 is a schematic block diagram of the computing device illustrated in FIG. 3 configured as a virtual computing device.

Referring now to FIG. 5, another embodiment of the computing device is based on the computing device 300' being configured as a virtual computing device. The virtual computing device 300' may include, for example, a Receiver and a RealTime Media Engine (RTME) 400', both by Citrix Systems, Inc. The Citrix Receiver allows the user to remotely access applications. The RealTime Media Engine is a plug-in to the Citrix Receiver to support audio-video calls, particularly with Microsoft Skype® for Business.

The computing device 300' includes the audio interceptor 360' which connects to the voice assistant service 320' via signal path 392'. The Receiver and RealTime Media Engine (RTME) 400 are coupled to a virtual delivery agent (VDA) 420' in a remote application server 430' via signal path 440'. This network connection allows remote access to applications in the audio conference application module 370'. The voice assistant service 320' interfaces with the collaboration service 322' via signal path 396'. The collaboration service 322' interfaces with the collaboration service connector module 372' via signal path 394'.

Figure 6:
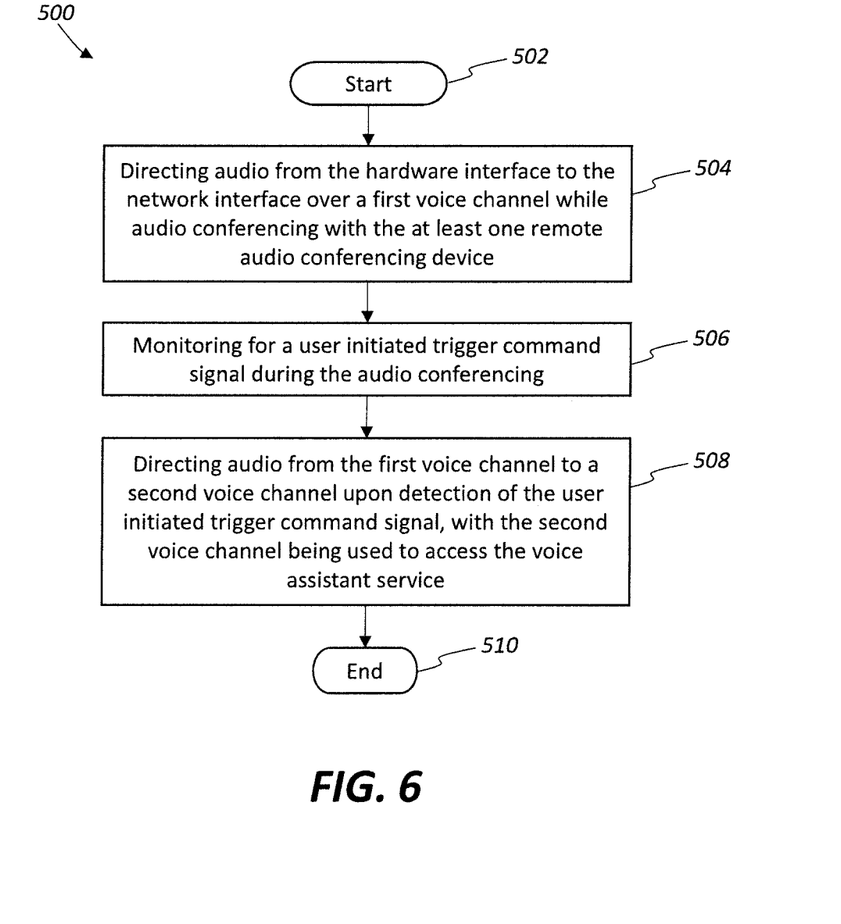
FIG. 6 is a flowchart illustrating a method for operating the computing device illustrated in FIG. 3.

Referring now to the flowchart 500 in FIG. 6, a method for operating the computing device 300 will be discussed. From the start (Block 502), the method includes directing audio from the hardware interface 332 to the network interface 334 over a first voice channel 362 while audio conferencing with at least one remote audio conferencing device 310 at Block 504. A user initiated trigger command signal 364 is monitored during the audio conferencing at Block 506. The method further includes, at Block 508, directing audio from the first voice channel 362 to a second voice channel 366 upon detection of the user initiated trigger command signal 364, with the second voice channel 366 being used to access the voice assistant service 320. The method ends at Block 510.

Yet another aspect is directed to a non-transitory computer readable medium for the computing device 300. The non-transitory computer readable medium has a plurality of computer executable instructions for causing the computing device 300 to perform steps comprising directing audio from the hardware interface 332 to the network interface 334 over a first voice channel 362 while audio conferencing with at least one remote audio conferencing device 310; monitoring for a user initiated trigger command signal 364 during the audio conferencing; and directing audio from the first voice channel 362 to a second voice channel 366 upon detection of the user initiated trigger command signal 364. The second voice channel 366 is used to access the voice assistant service 320.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. An audio conferencing apparatus located in a meeting room, the audio conferencing apparatus comprising:
    a housing;
    a hardware interface carried by said housing, with said hardware interface to be coupled to an external microphone and speaker assembly;
    a network interface carried by said housing, with said network interface to be coupled to a network for audio conferencing with at least one remote audio conferencing device, and for accessing a voice assistant service that operates to assist with the audio conferencing, with the voice assistant service accessing a collaboration service used to manage audio conferencing being conducted in the meeting room;
    a collaboration service connector module configured to interface with the collaboration service; and an audio interceptor carried by said housing and coupled between said hardware interface and said network interface, said audio interceptor comprising at least one processor configured to
- direct audio from said hardware interface to said network interface over a first voice channel while audio conferencing with the at least one remote audio conferencing device,
- monitor for a trigger command signal during the audio conferencing, with the trigger command signal being generated by a user of the audio conferencing apparatus and not a user of the at least one remote audio conferencing device,
- direct audio from the first voice channel to a second voice channel upon detection of the user initiated trigger command signal, with the second voice channel being used to access the collaboration service via the voice assistant service, with the collaboration service interfacing with said collaboration service connector module to query a calendar associated with the meeting room in response to a command received by the voice assistant service, and
- mix in the first voice channel a voice assistance audio response from the voice assistant service, directed to a status of the command received by the collaboration service, with audio from the at least one remote audio conferencing device while audio conferencing following the user initiated trigger command signal, but with a volume level of the audio from the at least one remote audio conferencing device being reduced as compared to a volume level of the voice assistance audio response.

2. The audio conferencing apparatus according to claim 1 wherein said at least one processor in said audio interceptor is further configured to monitor the first voice channel during the audio conferencing for a wake-word, and upon detection of a wake-word, generate the user initiated trigger command signal.

3. The audio conferencing apparatus according to claim 1 wherein said audio interceptor further comprises a push-to-talk device for providing the user initiated trigger command signal in response to a user activating said push-to-talk device.

4. The audio conferencing apparatus according to claim 1 wherein the second voice channel is separate from the first voice channel, and wherein said at least one processor in said audio interceptor is further configured to mute the first voice channel so that the audio following the user initiated trigger command signal is not received by the at least one remote audio conferencing device.

5. The audio conferencing apparatus according to claim 1 wherein said at least one processor in said audio interceptor is further configured to direct the audio following the user initiated trigger command signal to the second voice channel.

6. The audio conferencing apparatus according to claim 5 wherein said at least one processor in said audio interceptor is further configured to access in the second voice channel the voice assistant service via said network interface.

7. The audio conferencing apparatus according to claim 6 wherein said at least one processor in said audio interceptor is further configured to generate the user initiated trigger command signal, with the user initiated trigger command signal being used to direct the audio following the trigger command signal to the voice-assistance service.

8. The audio conferencing apparatus according to claim 6 wherein said at least one processor in said audio interceptor is further configured to:
- receive a voice assistance audio response from the voice assistant service in response to the voice assistant service receiving audio following the user initiated trigger command signal; and
- prevent the mixed voice assistance audio response from being received by the at least one remote audio conferencing device while audio conferencing.

9. A method for operating an audio conferencing apparatus, wherein the audio conferencing apparatus is located in a meeting room, wherein the audio conferencing apparatus includes a hardware interface to be coupled to an external microphone and speaker assembly, a network interface to be coupled to a network for audio conferencing with at least one remote audio conferencing device and for accessing a voice assistant service that operates to assist with the audio conferencing, with the voice assistant service accessing a collaboration service used to manage audio conferencing being conducted in the meeting room, a collaboration service connector module configured to interface with the collaboration service, and an audio interceptor coupled between the hardware interface and the network interface, the method comprising:
- directing audio from the hardware interface to the network interface over a first voice channel while audio conferencing with the at least one remote audio conferencing device;
- monitoring for a trigger command signal during the audio conferencing, with the trigger command signal being generated by a user of the audio conferencing apparatus and not a user of the at least one remote audio conferencing device;
- directing audio from the first voice channel to a second voice channel upon detection of the user initiated trigger command signal, with the second voice channel being used to access the collaboration service via the voice assistant service, with the collaboration service interfacing with the collaboration service connector module to query a calendar associated with the meeting room in response to a command received by the voice assistant service; and
- mixing in the first voice channel a voice assistance audio response from the voice assistant service, directed to a status of the command received by the collaboration service, with audio from the at least one remote audio conferencing device while audio conferencing following the user initiated trigger command signal, but with a volume level of the audio from the at least one remote audio conferencing device being reduced as compared to a volume level of the voice assistance audio response.

10. The method according to claim 9 wherein the audio interceptor comprises a wake-word detector module, and further comprising monitoring the first voice channel during the audio conferencing for a wake-word via the wake-word detector module, and upon detection of the wake-word, generating the user initiated trigger command signal.

11. The method according to claim 9 wherein the audio interceptor further comprises a push-to-talk device, and further comprising activating the push-to-talk device for providing the user initiated trigger command signal.

12. The method according to claim 9 wherein the second voice channel is separate from the first voice channel, and further comprising using the audio interceptor to mute the first voice channel so that the audio following the user initiated trigger command signal is not received by the at least one remote audio conferencing device.

13. The method according to claim 9 wherein the mixed voice assistance audio response is not received by the at least one remote audio conferencing device while audio conferencing.

14. The method according to claim 9 wherein the audio conferencing apparatus is configured as a virtual audio conferencing apparatus, and further comprising remotely interfacing with an audio-conferencing module via the network interface so as to audio conference with the at least one remote audio conferencing device.

15. A non-transitory computer readable medium for an audio conferencing apparatus, wherein the audio conferencing apparatus is located in a meeting room, wherein the audio conferencing apparatus includes a hardware interface to be coupled to an external microphone and speaker assembly, a network interface to be coupled to a network for audio conferencing with at least one remote audio conferencing device and for accessing a voice assistant service that operates to assist with the audio conferencing, with the voice assistant service accessing a collaboration service used to manage audio conferencing being conducted in the meeting room, a collaboration service connector module configured to interface with the collaboration service, and an audio interceptor coupled between the hardware interface and the network interface, the non-transitory computer readable medium having a plurality of computer executable instructions for causing the audio conferencing apparatus to perform steps comprising:

directing audio from the hardware interface to the network interface over a first voice channel while audio conferencing with the at least one remote audio conferencing device;

monitoring for a trigger command signal during the audio conferencing, with the trigger command signal being generated by a user of the audio conferencing apparatus and not a user of the at least one remote audio conferencing device;

directing audio from the first voice channel to a second voice channel upon detection of the user initiated trigger command signal, with the second voice channel being used to access the collaboration service via the voice assistant service, with the collaboration service interfacing with the collaboration service connector module to query a calendar associated with the meeting room in response to a command received by the voice assistant service; and mixing in the first voice channel a voice assistance audio response from the voice assistant service, directed to a status of the command received by the collaboration service, with audio from the at least one remote audio conferencing device while audio conferencing following the user initiated trigger command signal, but with a volume level of the audio from the at least one remote audio conferencing device being reduced as compared to a volume level of the voice assistance audio response.

16. The non-transitory computer readable medium according to claim 15 wherein the audio interceptor comprises a wake-word detector module, and further comprising monitoring the first voice channel for a wake-word via the wake-word detector module, and upon detection of the wake-word, generating the user initiated trigger command signal.

17. The non-transitory computer readable medium according to claim 15 wherein the audio interceptor further comprises a push-to-talk device for providing the user initiated trigger command signal, and further comprising monitoring the push-to-talk device for the user initiated trigger command signal.

18. The non-transitory computer readable medium according to claim 15 wherein the second voice channel is separate from the first voice channel, and further comprising using the audio interceptor to mute the first voice channel so that the audio following the user initiated trigger command signal is not received by the at least one remote audio conferencing device.

* * * * *